(12) United States Patent
Wu et al.

(10) Patent No.: US 12,558,953 B2
(45) Date of Patent: Feb. 24, 2026

(54) WHEEL-SIDE REDUCER SYSTEM AND VEHICLE

(71) Applicant: BYD COMPANY LIMITED, Guangdong (CN)

(72) Inventors: Changjia Wu, Shenzhen (CN); Yinsheng Liao, Shenzhen (CN); Gaoming Zhao, Shenzhen (CN); Feng Zhang, Shenzhen (CN); Qiang Wang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/628,878

(22) Filed: Apr. 8, 2024

(65) Prior Publication Data

US 2024/0253459 A1      Aug. 1, 2024

Related U.S. Application Data

(63) Continuation of application No. PCT/CN2022/134784, filed on Nov. 28, 2022.

(30) Foreign Application Priority Data

Nov. 29, 2021    (CN) .......................... 202122964588.0

(51) Int. Cl.
B60K 17/04 (2006.01)
B62D 7/18 (2006.01)
(Continued)

(52) U.S. Cl.
CPC .............. B60K 17/043 (2013.01); B62D 7/18 (2013.01); F16H 1/20 (2013.01); F16H 57/029 (2013.01);
(Continued)

(58) Field of Classification Search
CPC ........... B60K 17/043; B62D 7/18; F16H 1/20; F16H 2057/121; F16H 57/023
(Continued)

(56) References Cited

U.S. PATENT DOCUMENTS 1,396,102 A * 11/1921 Dunham .............. B60K 17/306
180/257
2,895,342 A * 7/1959 Hayhurst ................ F16H 57/12
74/409
(Continued)

FOREIGN PATENT DOCUMENTS

AT            9900 U1 * 1/2007 ............. F16H 55/28
CN      1709759 A    12/2005
(Continued)

OTHER PUBLICATIONS

AT-9900-U1 Machine Translation (Year: 2007).*
(Continued)

*Primary Examiner* — Jake Cook
(74) *Attorney, Agent, or Firm* — Calfee, Halter & Griswold LLP

(57) ABSTRACT

A wheel-side reducer system includes a housing, a speed reduction assembly, and a steering knuckle. The housing includes a front housing and a rear housing. The front housing and the rear housing are arranged opposite to each other and define an accommodating space together. The speed reduction assembly is arranged in the accommodating space. The steering knuckle is integrally molded on the front housing. The integrally molding of the steering knuckle on the front housing not only simplifies the production process of the housing, but also makes a connection between the steering knuckle and the front housing more reliable. Meanwhile, the integration level of the wheel-side reducer system can also be improved, to reduce the size of the wheel-side (Continued)

reducer system. A vehicle with the wheel-side reducer system is further disclosed.

16 Claims, 6 Drawing Sheets

(51) Int. Cl.

| | | |
|---|---|---|
| *F16H 1/20* | (2006.01) | |
| *F16H 57/02* | (2012.01) | |
| *F16H 57/029* | (2012.01) | |

(52) U.S. Cl.
CPC .............. *F16H 2057/02026* (2013.01); *F16H 2057/02052* (2013.01)

(58) Field of Classification Search
USPC ..................................................... 74/665 GA
See application file for complete search history.

(56) References Cited

U.S. PATENT DOCUMENTS

| | | | | |
|---|---|---|---|---|
| 8,708,570 B2 * | 4/2014 | Umekida | .............. | F16D 1/0858 384/544 |
| 2011/0009199 A1 * | 1/2011 | Yamauchi | ........... | B60B 27/0042 464/106 |
| 2012/0181850 A1 | 7/2012 | Armfield | | |
| 2019/0389304 A1 | 12/2019 | Wood et al. | | |
| 2021/0023941 A1 | 1/2021 | Stephan et al. | | |
| 2021/0053411 A1 | 2/2021 | Gordon | | |
| 2021/0347256 A1 | 11/2021 | Smith | | |
| 2022/0332185 A1 * | 10/2022 | Pultz | ................... | B60K 17/046 |

FOREIGN PATENT DOCUMENTS

| | | |
|---|---|---|
| CN | 101648495 A | 2/2010 |
| CN | 206416839 A | 8/2017 |
| CN | 209671528 U | 11/2019 |
| CN | 110617311 A | 12/2019 |
| CN | 212400899 A | 1/2021 |
| CN | 216709019 A | 6/2022 |
| JP | 2010047058 A | 3/2010 |
| JP | 2016217460 A | 12/2016 |

OTHER PUBLICATIONS

Segade Robleda, Abraham & Vilán-Vilán, José-Antonio & López-Lago, Marcos & Casarejos, Enrique. (2012). Split Torque Gearboxes: Requirements, Performance and Applications. 10.5772/37258. (Year: 2012).*

International Search Report and Written Opinion from PCT/CN2022/134784 dated Feb. 24, 2023.

* cited by examiner

1000

WHEEL-SIDE REDUCER SYSTEM AND VEHICLE

CROSS-REFERENCE TO RELATED APPLICATIONS

The present disclosure is a bypass continuation of PCT International Application No. PCT/CN2022/134784, filed on Nov. 28, 2022, which claims priority to and benefits of Chinese Patent Application No. 202122964588.0, entitled "WHEEL-SIDE REDUCER SYSTEM AND VEHICLE" and filed on Nov. 29, 2021. The entire contents of the above-referenced applications are incorporated herein by reference.

FIELD

The present disclosure relates to the technical field of reducers, and more specifically, to a wheel-side reducer system and a vehicle.

BACKGROUND

In related arts, speed will be reduced and torque will be increased through a reducer before power of a vehicle is transmitted to a wheel, to enhance the power output of the vehicle. To make power transmission more reliable, transmission gears in the reducer are arranged in a rhombus pattern to improve the transmission stability of the reducer. However, this not only makes the structural design of the reducer more complex and increase the production difficulty of the reducer, but also increases the size of the reducer, affecting design and assembly of structures near the reducer, and reducing the integration level of the vehicle.

SUMMARY

The present disclosure aims to solve at least one of the technical problems in a related art. Therefore, one objective of the present disclosure is to provide a wheel-side reducer system.

Another objective of the present disclosure is to provide a vehicle. The wheel-side reducer system is arranged in the vehicle.

A wheel-side reducer system according to an embodiment of a first aspect of the present disclosure includes: a housing, a speed reduction assembly, and a steering knuckle. The housing includes a front housing and a rear housing. The front housing and the rear housing are arranged opposite to each other and define an accommodating space together. The speed reduction assembly is arranged in the accommodating space. The steering knuckle is integrally molded on the front housing.

In some embodiments, the steering knuckle includes a steering main body and multiple mounting portions. The multiple mounting portions are arranged on an edge of the steering main body. The steering main body is integrally molded on a front surface of the front housing.

In some embodiments, the front housing is provided with a first input hole that matches the speed reduction assembly. The steering main body is provided with a second input hole. The second input hole and the first input hole are provided opposite to each other. The steering main body is further provided with an avoidance space that surrounds the second input hole.

In some embodiments, the speed reduction assembly includes an input shaft, a first intermediate shaft, a second intermediate shaft, and an output shaft. An input gear is arranged on the input shaft. A first intermediate gear is arranged on the first intermediate shaft. The first intermediate gear is engaged with the input gear. A second intermediate gear is arranged on the second intermediate shaft. The second intermediate gear is engaged with the input gear. An output gear is arranged on the output shaft. The output gear is engaged with each of the first intermediate gear and the second intermediate gear. Orthographic projections of a center line of the input gear, a center line of the first intermediate gear, a center line of the output gear, and a center line of the second intermediate gear are sequentially connected to form a non-rhombic quadrilateral.

In some embodiments, the first intermediate gear and the second intermediate gear are two gears with the same modulus and different numbers of teeth.

In some embodiments, the wheel-side reducer system further includes a transmission shaft. The speed reduction assembly includes an input shaft. The transmission shaft is connected to the input shaft through a fastener to limit the transmission shaft and the input shaft in an axial direction.

In some embodiments, a mounting hole is provided in the input shaft. The transmission shaft is arranged in the mounting hole. A step portion is formed on an inner wall of the mounting hole. An internally threaded hole is formed in the transmission shaft. The fastener is a bolt. The bolt is propped against the transmission shaft and is connected to an interior of the internally threaded hole.

In some embodiments, the transmission shaft is further connected to the input shaft through a spline.

An external spline is provided on the transmission shaft. The mounting hole is provided in the input shaft. An internal spline is provided in the mounting hole. An end portion of the transmission shaft extends into the mounting hole. The external spline matches the internal spline.

In some embodiments, the wheel-side reducer system further includes: a waterproof sealing ring. The waterproof sealing ring is arranged in the mounting hole and is sleeved over the input shaft. The waterproof sealing ring is located on an outer side of the external spline.

In some embodiments, the wheel-side reducer system further includes: a hub bearing. The hub bearing is arranged in the rear housing and is sleeved over the output shaft. The rear housing is further provided with a limiting piece that is in limiting fit with the hub bearing in an axial direction.

In some embodiments, the wheel-side reducer system further includes a flange plate. The flange plate is fixedly connected to the output shaft. The hub bearing is press-fitted in the flange plate.

In some embodiments, the output gear is integrally molded on the output shaft.

A vehicle according to an embodiment of a second aspect of the present disclosure includes the wheel-side reducer system according to the embodiment of the foregoing first aspect of the present disclosure.

Additional aspects and advantages of the present disclosure will be provided in the following description, and some of which will become apparent from the following description or may be learned from practices of the present disclosure.

BRIEF DESCRIPTION OF THE DRAWINGS

The foregoing and/or additional aspects and advantages of the present disclosure will become apparent and comprehensible from the following descriptions of the embodiments with reference to accompanying drawings, where.

DETAILED DESCRIPTION

Figure 1:
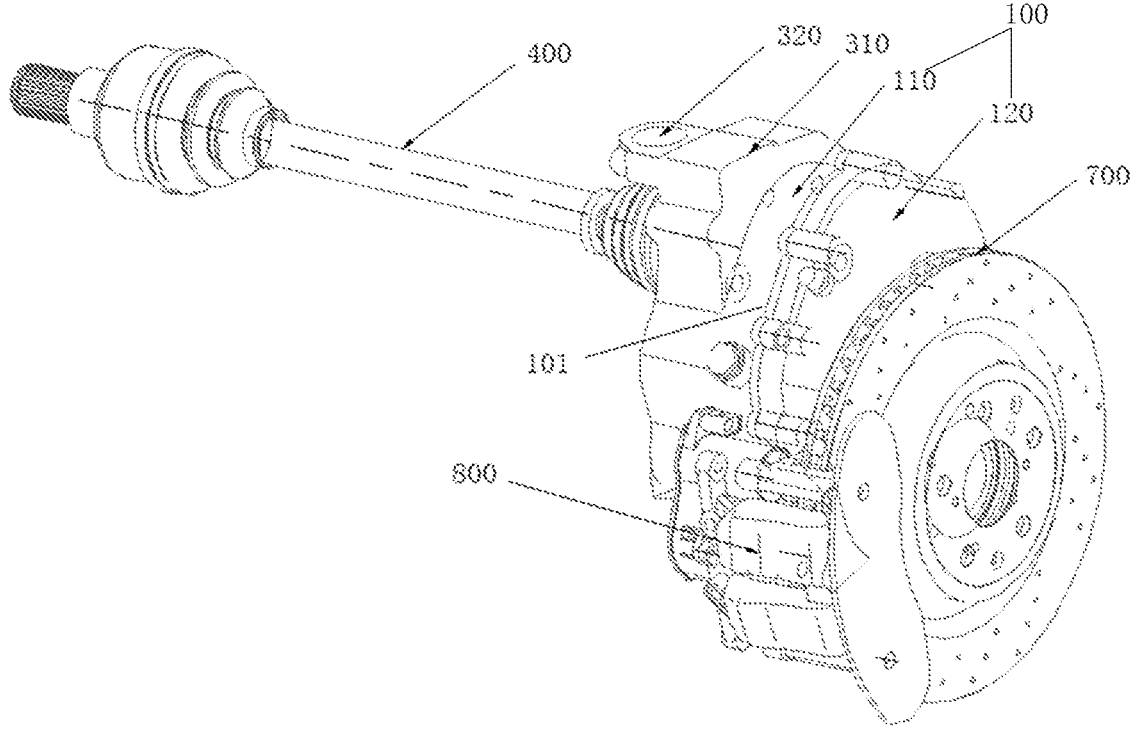
FIG. 1 is one schematic structural diagram of a wheel-side reducer system according to an embodiment of the present disclosure.
Figure 2:
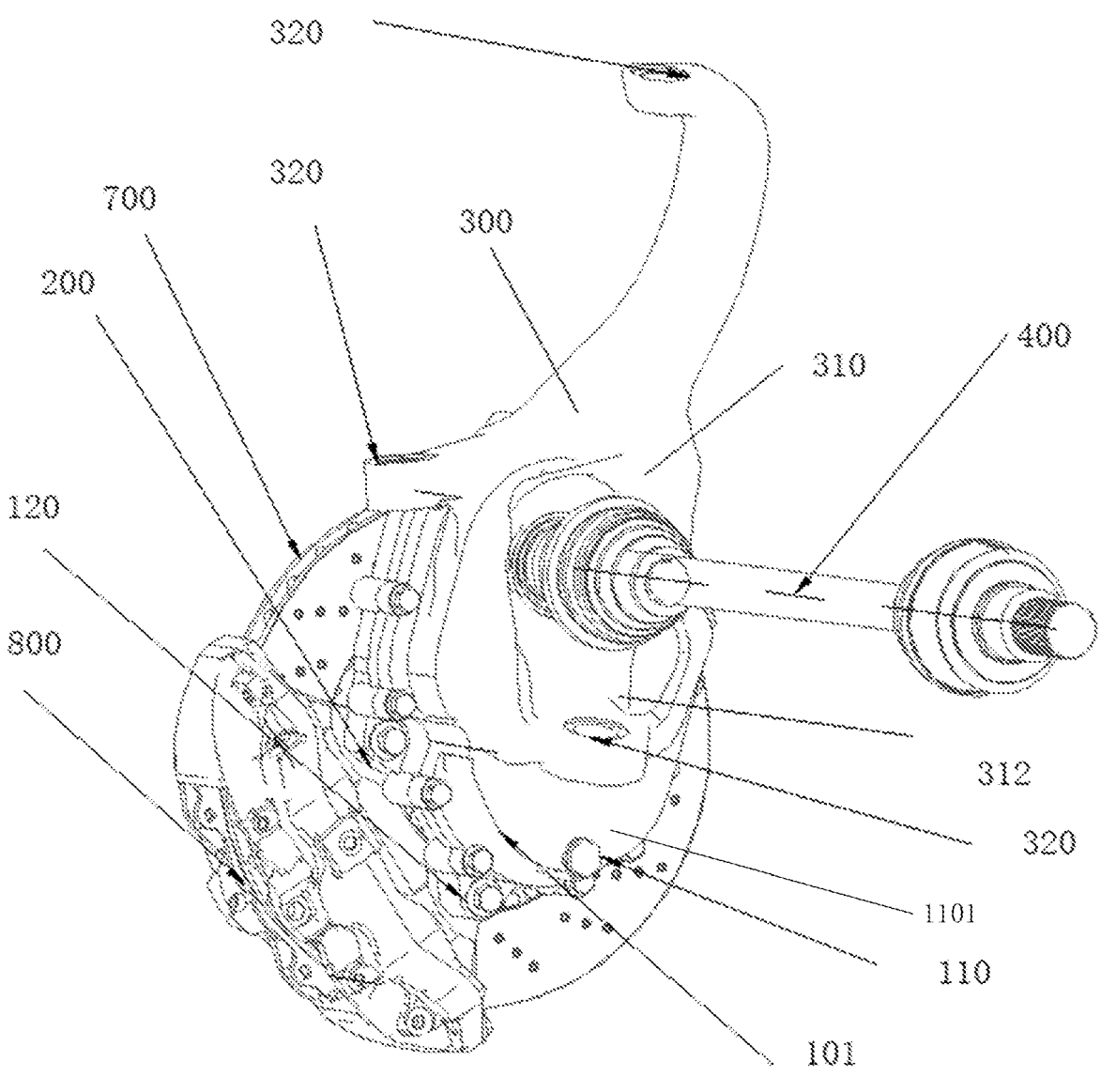
FIG. 2 is another schematic structural diagram of a wheel-side reducer system according to an embodiment of the present disclosure.

Embodiments described with reference to accompanying drawings are explanatory. The embodiments of the present disclosure are described below in detail.

A wheel-side reducer system 1 according to an embodiment of a first aspect of the present disclosure is described below with reference to FIG. 1 to FIG. 5. The wheel-side reducer system 1 includes a housing 100, a speed reduction assembly 200, and a steering knuckle 300.

Specifically, the housing 100 includes a front housing 110 and a rear housing 120. The front housing 110 and the rear housing 120 are arranged opposite to each other and define an accommodating space 101 together. The speed reduction assembly 200 is arranged in the accommodating space 101. The steering knuckle 300 is integrally molded on the front housing 110.

It is to be noted that, during actual design of a vehicle, the wheel-side reducer system 1 may be arranged, so that rotating speed may be reduced and torque may be increased when power is transmitted to a wheel of a vehicle to improve a driving effect of the vehicle.

It may be understood that, during use of the wheel-side reducer system 1, the power is transmitted to the speed reduction assembly 200 to achieve effects of reducing the speed and increasing the torque. Meanwhile, the speed reduction assembly 200 can transmit the torque to drive the wheel of the vehicle to rotate.

Meanwhile, the front housing 110 and the rear housing 120 form the housing 100, so that mold stripping of the front housing 110 and the rear housing 120 is simpler, production efficiency is improved, structures of the front housing 110 and the rear housing 120 are more stable, the structural strength of the housing 100 is improved, and the accommodating space 101 formed by the housing 100 is more reliable. In this way, the housing 100 can better protect the speed reduction assembly 200 mounted in the accommodating space 101, thereby improving the use performance of the wheel-side reducer system 1.

In addition, the integration of the steering knuckle 300 on the front housing 110 can improve the integration level of the wheel-side reducer system 1 and reduce the size of the wheel-side reducer system 1, thereby facilitating the arrangement of the wheel-side reducer system 1. In addition, the steering knuckle 300 is integrated on the front housing 110, so that the assembled wheel-side reducer system 1 can provide space for the assembly of other parts in the vehicle, an assembly process of the vehicle is simplified, and assembly efficiency is improved. Moreover, the integration of the steering knuckle 300 on the front housing 110 can also make a connection between the housing 100 and the steering knuckle 300 more reliable and improve the use reliability of the steering knuckle 300, thereby improving the use performance of the steering knuckle 300, and stably controlling a travel direction of the vehicle by manipulating the steering knuckle 300. Further, the front housing 110 is connected to the steering knuckle 300 in an integrally molding manner, so that production steps of the housing 100 can be omitted, the production process of the housing 100 can be simplified, the connection strength between the steering knuckle 300 and the front housing 110 can be improved, the overall structural strength of the wheel-side reducer system 1 can be improved, and the use safety and reliability of the wheel-side reducer system 1 can be improved. Compared with a split connection between a steering knuckle and a front housing, the integration of the steering knuckle 300 on the front housing 110 also reduces a wheel tread of the vehicle and reduces a turning radius.

According to the wheel-side reducer system 1 of the embodiment of the present disclosure, the steering knuckle 300 is integrally molded on the front housing 110, so that the production process of the housing 100 is simplified, production efficiency is simplified, a connection between the steering knuckle 300 and the front housing 110 is more reliable, and the use performance of the steering knuckle 300 is improved. Meanwhile, the integration of the steering knuckle 300 on the front housing 110 also improves the integration level of the wheel-side reducer system 1 and reduces the size of the wheel-side reducer system 1, thereby simplifying design and assembly processes of a vehicle.

In some embodiments, as shown in FIG. 1, the steering knuckle 300 includes a steering main body 310 and multiple mounting portions 320. The multiple mounting portions 320 are arranged on an edge of the steering main body 310. The steering main body 310 is integrally molded on a front surface 1101 of the front housing 110. It may be understood that the multiple mounting portions 320 are configured to be connected to a suspension of a vehicle, so that the steering knuckle 300 can not only achieve an effect of supporting the vehicle, but also control travel directions of wheels, thereby adjusting a travel direction of the vehicle. In this way, the multiple mounting portions 320 are arranged on the edge of the steering main body 310, so that the connection reliability between the steering knuckle 300 and the vehicle is improved, and the use reliability of the steering knuckle 300 is improved. In addition, the integrally molding of the steering main body 310 on the front housing 110 facilitates the production and manufacturing of the front housing 110, improves production efficiency, improves the connection reliability between the steering knuckle 300 and the front housing 110, and improves the connection strength between the steering knuckle 300 and the front housing 110, thereby improving the use performance of the wheel-side reducer system 1.

Figure 5:
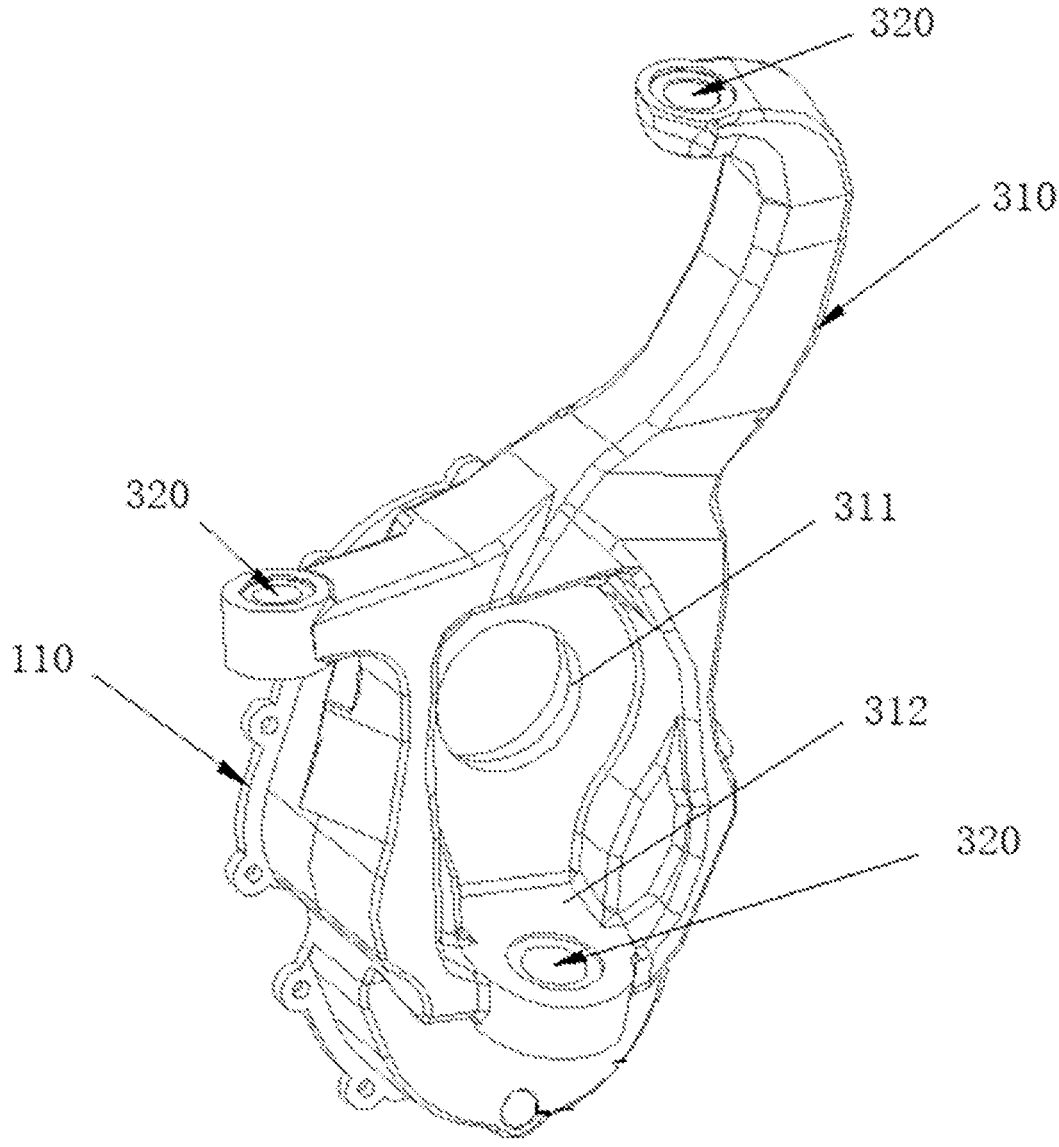
FIG. 5 is a schematic structural diagram of a front housing of a housing of a wheel-side reducer system according to an embodiment of the present disclosure.

In some embodiments, as shown in FIG. 5, the front housing 110 is provided with a first input hole (not shown in the figure) that matches the speed reduction assembly 200. The steering main body 310 is provided with a second input hole 311. The second input hole 311 and the first input hole are provided opposite to each other. The steering main body 310 is further provided with an avoidance space 312 that surrounds the second input hole 311. In this way, the first input hole and the second input hole 311 are provided opposite to each other, so that a transmission shaft 400 may penetrate through the first input hole and the second input hole 311 to extend into the housing 100 when the wheel-side reducer system 1 is used, power on the transmission shaft 400 can act on the wheel-side reducer system 1 more stably to improve the power input reliability of the wheel-side reducer system 1 and to improve the use performance of the wheel-side reducer system 1. Meanwhile, the avoidance space 312 provided in the steering main body 310 can not only provide use space for the wheel-side reducer system 1 to realize simple and convenient use of the wheel-side reducer system 1, but also reduce production materials of the housing 100 to reduce the production cost of the wheel-side reducer system 1.

Figure 4:
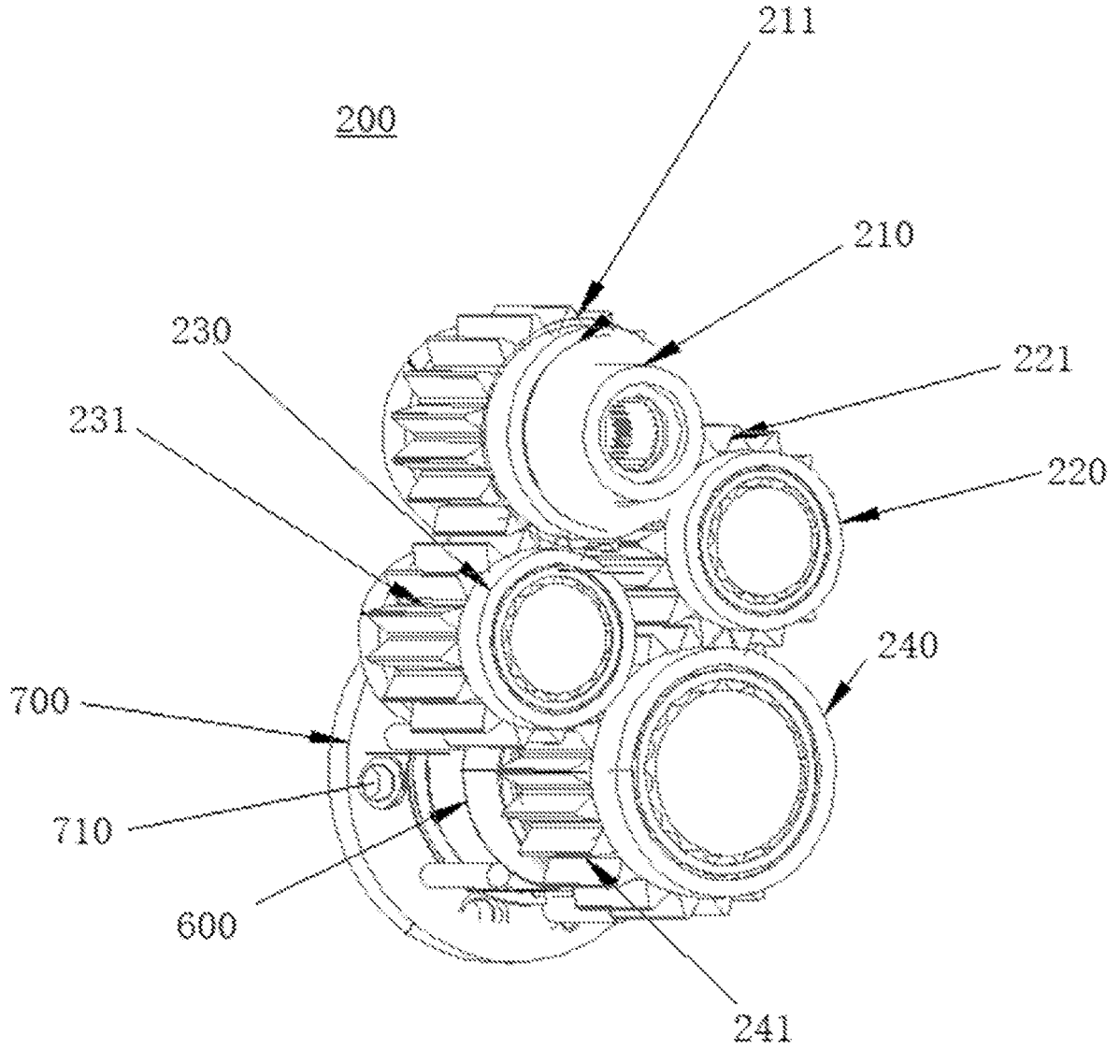
FIG. 4 is a schematic structural diagram of a speed reduction assembly in a wheel-side reducer system according to an embodiment of the present disclosure.

In some embodiments, as shown in FIG. 4, the speed reduction assembly 200 includes an input shaft 210, a first intermediate shaft 220, a second intermediate shaft 230, and an output shaft 240. An input gear 211 is arranged on the input shaft 210. A first intermediate gear 221 is arranged on the first intermediate shaft 220. The first intermediate gear 221 is engaged with the input gear 211. A second intermediate gear 231 is arranged on the second intermediate shaft 230. The second intermediate gear 231 is engaged with the input gear 211. An output gear 241 is arranged on the output shaft 240. The output gear 241 is engaged with each of the first intermediate gear 221 and the second intermediate gear 231. Orthographic projections of a center line of the input gear 211, a center line of the first intermediate gear 221, a center line of the output gear 241, and a center line of the second intermediate gear 231 are sequentially connected to form a non-rhombic quadrilateral.

It may be understood that, after power is transmitted to the speed reduction assembly 200 by the transmission shaft 400, the power is transmitted through the engagement between the input gear 211 and the first intermediate gear 221 and between the input gear 211 and the second intermediate gear 231, the power is transmitted to the output gear 241 through the engagement between the first intermediate gear 221 and the second intermediate gear 231, and finally, the power is transmitted out through the output shaft 240 connected to the output gear 241 to achieve effects of reducing speed and increasing torque on the power.

Meanwhile, using the first intermediate gear 221 and the second intermediate gear 231 as transfer points of power transmission can improve the use stability of the speed reduction assembly 200 and prolong the service life of the wheel-side reducer system 1. In addition, because the shape formed by sequentially connecting the orthographic projections of the center line of the input gear 211, the center line of the first intermediate gear 221, the center line of the output gear 241, and the center line of the second intermediate gear 231 is a non-rhombic quadrilateral, available space in the wheel-side reducer system 1 can be increased to provide an assembly position for brake calipers 800 arranged on the wheel-side reducer system 1, thereby improving the integration level of the wheel-side reducer system 1, reducing the size of the wheel-side reducer system 1, and facilitating assembly and arrangement of the wheel-side reducer system 1.

In some specific embodiments, the first intermediate gear 221 and the second intermediate gear 231 are two gears with the same modulus and different numbers of teeth. By such an arrangement, the speed reduction assembly 200 may be adjusted according to user needs when the speed reduction assembly 200 is designed and produced, so that the design of the wheel-side reducer system 1 satisfies user demands better, and meanwhile, the structural design of the wheel-side reducer system 1 can also be simplified to facilitate assembly of the wheel-side reducer system 1 and improve assembly efficiency.

Figure 3:
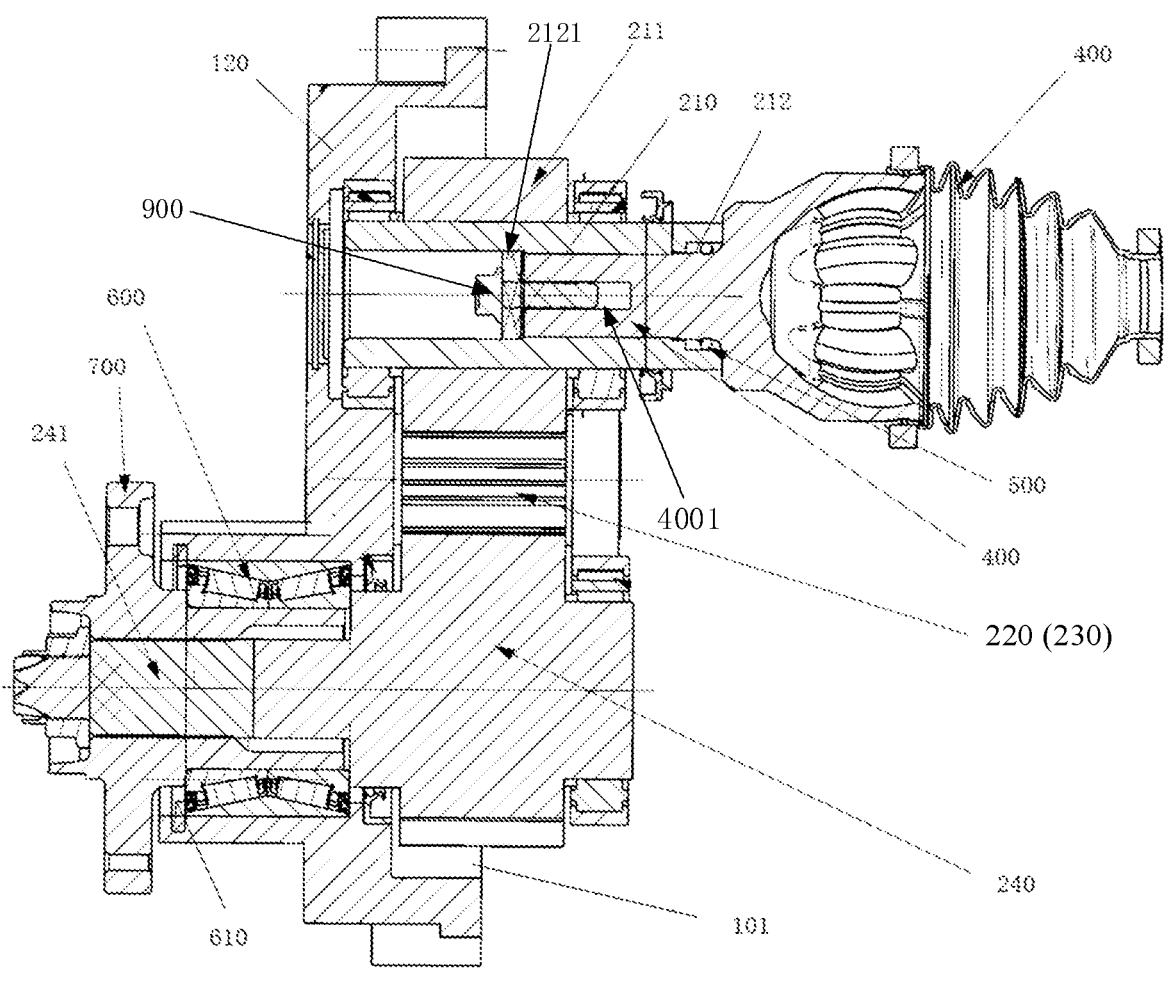
FIG. 3 is a schematic sectional view of a wheel-side reducer system according to an embodiment of the present disclosure.

In some embodiments, as shown in FIG. 3, the wheel-side reducer system 1 further includes the transmission shaft 400. A fastener 900 such as a bolt is arranged between the transmission shaft 400 and the input shaft 210 for connecting and fixing, to limit the transmission shaft 400 and the input shaft 210 in an axial direction, prevent a reducer assembly from disconnecting from a connection between the transmission shaft 400 and the input shaft 210, and greatly reduce the risk of wheel falling off.

A mounting hole 212 is provided in the input shaft 210, and the transmission shaft 400 is arranged in the mounting hole 212. A step portion 2121 is formed on an inner wall of the mounting hole 212. An internally threaded hole 4001 is formed in the transmission shaft 400. A bolt is propped against the transmission shaft 400 and is connected to an interior of the internally threaded hole 4001, to connect the input shaft 210 and the transmission shaft 400 in an axial direction. In a specific embodiment, a gasket is further arranged between the step portion 2121 and the bolt.

The transmission shaft 400 is further connected to the input shaft 210 through a spline. An external spline is provided on the transmission shaft 400. An internal spline is provided in the mounting hole 212. An end portion of the transmission shaft 400 extends into the mounting hole 212, and the external spline matches the internal spline.

It may be understood that, during use of the wheel-side reducer system 1, power is transmitted to an interior of the wheel-side reducer system 1 through the transmission shaft 400 for reducing speed and increasing torque. Therefore, the transmission shaft 400 is connected to the input shaft 210 in a spline connecting manner. The design of the spline has a relatively small impact on the transmission shaft 400 and the input shaft 210, so that the structural strength of the transmission shaft 400 and the input shaft 210 is improved, the transmission connection reliability between the transmission shaft 400 and the input shaft 210 is improved, the power can be more stably transmitted to the interior of the wheel-side reducer system 1 through the transmission shaft 400, and the wheel-side reducer system 1 can reduce the speed and increase the torque of the power more stably.

In some embodiments, as shown in FIG. 3, the wheel-side reducer system 1 further includes a waterproof sealing ring 500. The waterproof sealing ring 500 is arranged in the mounting hole 212 and is sleeved over the input shaft 210. The waterproof sealing ring 500 is located on an outer side of the external spline.

Therefore, the arrangement of the waterproof sealing ring 500 between the transmission shaft 400 and the input shaft 210 can improve the waterproof effect of the wheel-side reducer system 1. By such an arrangement, water can be prevented from entering the wheel-side reducer system 1 from a connection between the transmission shaft 400 and the input shaft 210 to prolong the service life of the wheel-side reducer system 1, and the use reliability of the wheel-side reducer system 1 in a vehicle can be improved to improve the use performance of the wheel-side reducer system 1.

In some embodiments, as shown in FIG. 3, the wheel-side reducer system 1 further includes a hub bearing 600. The hub bearing 600 is arranged in the rear housing 120 and is sleeved over the output shaft 240. The rear housing 120 is further provided with a limiting piece 610 that limits and matches the hub bearing 600 in an axial direction. By such an arrangement, during use of the wheel-side reducer system 1, power may be output through the output shaft 240 and may be output to a hub through the hub bearing 600, to adjust a travel direction of the hub. Meanwhile, the arrangement of the limiting piece 610 in the rear housing 120 can improve the connection stability between the hub bearing 600 and the rear housing 120 to improve the use performance of the wheel-side reducer system 1.

In some embodiments, as shown in FIG. 4, the wheel-side reducer system 1 further includes a flange plate 700. The flange plate 700 is fixedly connected to the output shaft 240. The hub bearing 600 is press-fitted in the flange plate 700. Mounting holes 710 are formed in a circumference of the flange plate 700. The mounting holes 710 are used for mounting a wheel, and specifically, used for mounting the brake calipers 800. During mounting, the hub bearing 600 is press-fitted in the rear housing 120 first, and then the flange plate 700 is press-fitted with the hub bearing 600, to complete mounting. The flange plate 700 is connected to the output shaft 240 through a spline. The flange plate 700 is connected to the output shaft 240, so that power acts on the hub after reliably acting on the flange plate 700. Therefore, the stability of transmitting the power can be improved to control the hub more reliably, and the wheel-side reducer system 1 can be integrated with more parts to improve the integration level of the wheel-side reducer system 1 and make a structure of a vehicle simpler and reliable. In some specific embodiments, the output gear 241 is integrally molded on the output shaft 240. By such an arrangement, the output gear 241 is integrally molded on the output shaft 240, so power can be more reliably transmitted to the output shaft 240 when the output gear 241 transmits the power, power transmitting efficiency is improved, and the use performance of the wheel-side reducer system 1 is improved.

Figure 6:
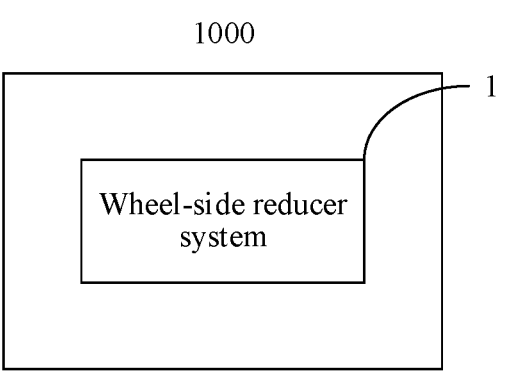
FIG. 6 is a schematic block diagram of a vehicle according to an embodiment of the present disclosure.

As shown in FIG. 6, a vehicle according to an embodiment of a second aspect of the present disclosure includes the wheel-side reducer system 1 as described in any of the foregoing embodiments of the first aspect of the present disclosure.

According to the vehicle of the embodiment of the present disclosure, the wheel-side reducer system 1 as described above is arranged, and the steering knuckle 300 is integrally molded on the front housing 110, so that the production process of the housing 100 is simplified, production efficiency is improved, the connection reliability between the steering knuckle 300 and the front housing 110 is improved, and the use performance of the steering knuckle 300 is improved. Meanwhile, the integration of the steering knuckle 300 on the front housing 110 also improves the integration level of the wheel-side reducer system 1 and reduces the size of the wheel-side reducer system 1, making the design and assembly of the vehicle simpler and more reliable.

Other configurations and operations of the vehicle according to the embodiments of the present disclosure are known to those of ordinary skill in the art and will not be described in detail herein.

In the description of the present specification, the descriptions of the reference terms such as "one embodiment", "some embodiments", "an exemplary embodiment", "example", "specific example", or "some examples" mean that the specific features, structures, materials or characteristics described with reference to the embodiment or example are included in at least one embodiment or example of the present disclosure. In the present specification, illustrative expressions of the foregoing terms do not necessarily refer to the same embodiment or example.

Although the embodiments of the present disclosure have been shown and described, a person of ordinary skill in the art should understand that various changes, modifications, replacements and variations may be made to the embodiments without departing from the principles and spirit of the present disclosure, and the scope of the present disclosure is as defined by the appended claims and their equivalents.

What is claimed is:

1. A wheel-side reducer system, comprising:
a housing, comprising a front housing and a rear housing, and the front housing and the rear housing being arranged opposite to each other and defining an accommodating space together;
a speed reduction assembly, arranged in the accommodating space; and
a steering knuckle, integrally molded on the front housing and comprising:
a steering main body, integrally molded on a front surface of the front housing; and
a plurality of mounting portions, are arranged on an edge of the steering main body,
wherein the speed reduction assembly comprises:
an input shaft, wherein an input gear is arranged on the input shaft;
a first intermediate shaft, wherein a first intermediate gear is arranged on the first intermediate shaft, and the first intermediate gear is engaged with the input gear;
a second intermediate shaft, wherein a second intermediate gear is arranged on the second intermediate shaft, and the second intermediate gear is engaged with the input gear; and
an output shaft, wherein an output gear is arranged on the output shaft, and the output gear is engaged with both the first intermediate gear and the second intermediate gear; and
wherein orthographic projections of a center line of the input gear, a center line of the first intermediate gear, a center line of the output gear, and a center line of the second intermediate gear are sequentially connected to form a non-rhombic quadrilateral.

2. The wheel-side reducer system according to claim 1, wherein the front housing is provided with a first input hole that matches the speed reduction assembly, the steering main body is provided with a second input hole, the second input hole and the first input hole are provided opposite to each other, and the steering main body is further provided with an avoidance space that surrounds the second input hole.

3. The wheel-side reducer system according to claim 1, wherein the first intermediate gear and the second intermediate gear are two gears with the same modulus and different numbers of teeth.

4. The wheel-side reducer system according to claim 1, further comprising a transmission shaft, the speed reduction assembly comprising an input shaft, and the transmission shaft being connected to the input shaft through a fastener to limit the transmission shaft and the input shaft in an axial direction.

5. The wheel-side reducer system according to claim 4, wherein a mounting hole is provided in the input shaft, and the transmission shaft is arranged in the mounting hole; and
a step portion is formed on an inner wall of the mounting hole, an internally threaded hole is formed in the transmission shaft, the fastener is a bolt, and the bolt is propped against the transmission shaft and is connected to an interior of the internally threaded hole.

6. The wheel-side reducer system according to claim 5, wherein the transmission shaft is further connected to the input shaft through a spline; and
an external spline is provided on the transmission shaft, the mounting hole is provided in the input shaft, an internal spline is provided in the mounting hole, an end portion of the transmission shaft extends into the mounting hole, and the external spline matches the internal spline.

7. The wheel-side reducer system according to claim 6, further comprising: a waterproof sealing ring, the waterproof sealing ring being arranged in the mounting hole and being sleeved over the input shaft, and the waterproof sealing ring being located on an outer side of the external spline.

8. The wheel-side reducer system according to claim 1, further comprising: a hub bearing, the hub bearing being arranged in the rear housing and being sleeved over the output shaft, and the rear housing being further provided with a limiting piece that is in limiting fit with the hub bearing in an axial direction.

9. The wheel-side reducer system according to claim 8, further comprising: a flange plate, the flange plate being fixedly connected to the output shaft, and the hub bearing being press-fitted in the flange plate.

10. The wheel-side reducer system according to claim 1, wherein the output gear is integrally molded on the output shaft.

11. A vehicle, comprising: the wheel-side reducer system according to claim 1.

12. The wheel-side reducer system according to claim 2, wherein the first intermediate gear and the second intermediate gear are two gears with the same modulus and different numbers of teeth.

13. The wheel-side reducer system according to claim 1, further comprising a transmission shaft, the speed reduction assembly comprising an input shaft, and the transmission shaft being connected to the input shaft through a fastener to limit the transmission shaft and the input shaft in an axial direction.

14. The wheel-side reducer system according to claim 2, further comprising a transmission shaft, the speed reduction assembly comprising an input shaft, and the transmission shaft being connected to the input shaft through a fastener to limit the transmission shaft and the input shaft in an axial direction.

15. The wheel-side reducer system according to claim 3, further comprising: a hub bearing, the hub bearing being arranged in the rear housing and being sleeved over the output shaft, and the rear housing being further provided with a limiting piece that is in limiting fit with the hub bearing in an axial direction.

16. The wheel-side reducer system according to claim 3, wherein the output gear is integrally molded on the output shaft.

\* \* \* \* \*